United States Patent
Fang et al.

(10) Patent No.: US 12,328,769 B2
(45) Date of Patent: Jun. 10, 2025

(54) SYSTEM AND METHOD FOR SIGNALING DESIGN AND CONFIGURATION

(71) Applicant: ZTE CORPORATION, Guangdong (CN)

(72) Inventors: Huiying Fang, Shenzhen (CN); Bo Dai, Shenzhen (CN); Kun Liu, Shenzhen (CN); Jianxun Ai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 366 days.

(21) Appl. No.: 17/853,408

(22) Filed: Jun. 29, 2022

(65) Prior Publication Data

US 2023/0009307 A1 Jan. 12, 2023

Related U.S. Application Data

(63) Continuation of application No. PCT/CN2020/106991, filed on Aug. 5, 2020.

(51) Int. Cl.
*H04W 74/0833* (2024.01)
*H04W 72/0453* (2023.01)

(52) U.S. Cl.
CPC ... *H04W 74/0833* (2013.01); *H04W 72/0453* (2013.01)

(58) Field of Classification Search
CPC ............ H04W 74/0833; H04W 72/0453
See application file for complete search history.

(56) References Cited

U.S. PATENT DOCUMENTS

| | | |
|---|---|---|
| 2018/0132273 A1 | 5/2018 | Zhang et al. |
| 2019/0124646 A1 | 4/2019 | Ly et al. |
| 2019/0363843 A1 | 11/2019 | Gordaychik |
| 2019/0364589 A1 | 11/2019 | Martin et al. |
| 2021/0289536 A1* | 9/2021 | Liu .................. H04W 74/0841 |
| 2022/0029659 A1* | 1/2022 | Liu .................. H04B 1/7143 |
| 2023/0070068 A1* | 3/2023 | Hu .................. H04W 72/51 |
| 2023/0125571 A1* | 4/2023 | MolavianJazi ....... H04L 1/1896 370/329 |
| 2023/0199859 A1* | 6/2023 | Li .................. H04W 48/16 370/329 |

FOREIGN PATENT DOCUMENTS

| | | |
|---|---|---|
| CN | 110719650 A | 1/2020 |
| CN | 111345089 A | 6/2020 |

(Continued)

OTHER PUBLICATIONS

Extended European Search Report on EP Appln. No. 20948650.5, dated Mar. 29, 2023 (11 pages).

(Continued)

*Primary Examiner* — Michael Thier
*Assistant Examiner* — Nevena Zecevic Sandhu
(74) *Attorney, Agent, or Firm* — Foley & Lardner LLP

(57) ABSTRACT

A system and method for signaling design and configuration are disclosed herein. In one embodiment, the system and method are configured to transmit, by a wireless communication node to a first wireless communication device, configuration information, wherein the first wireless communication device is a reduced capability user equipment device, and wherein the configuration information includes a Physical Random Access Channel configuration.

18 Claims, 13 Drawing Sheets

(56) References Cited

FOREIGN PATENT DOCUMENTS

| | | |
|---|---|---|
| CN | 111436132 A | 7/2020 |
| EP | 3 997 949 A1 | 5/2022 |
| EP | 4 096 291 A1 | 11/2022 |

OTHER PUBLICATIONS

Huawei et al: "Other aspects for reduced capability devices", 3GPP Draft; 3GPP TSG RAN WG1 Meeting#101-e; R1-2004612, E-Meeting, May 16, 2020 (6 pages).
International Search Report and Written Opinion for PCT Appl. No. PCT/CN2020/106991, mailed May 8, 2021 (9 pages).
ZTE: "Discussion on potential UE complexity reduction features" 3GPP TSG RAN WG1 Meeting #101; R1-2003801; Jun. 5, 2020; e-Meeting (6 pages).

* cited by examiner

SYSTEM AND METHOD FOR SIGNALING DESIGN AND CONFIGURATION

CROSS-REFERENCE TO RELATED APPLICATION

This application claims the benefit of priority under 35 U.S.C. § 120 as a continuation of PCT Patent Application No. PCT/CN2020/106991, filed on Aug. 5, 2020, the disclosure of which is incorporated herein by reference in its entirety.

TECHNICAL FIELD

The disclosure relates generally to wireless communications and, more particularly, to systems and methods for signaling design and configuration.

BACKGROUND

New Radio technology (NR) is a new radio access technology developed by $3^{rd}$ Generation Partnership Project (3GPP) as a standard for air interfaces in radio networks. Available frequencies for use in NR systems include a first frequency range (FR1) and a second frequency range (FR2). Frequencies in FR1 include sub-6 GHz frequencies and frequencies in FR2 include frequencies in the millimeter wavelength range.

A reduced capability User Equipment device (UE) may be a UE with lower device complexity and reduced energy consumption compared to other UE devices such as full NR devices (hereinafter "legacy UE"). A reduced capability device may have a reduced number of transmission and/or reception antennas, a reduction of the minimum required device bandwidth, reduced duplexing capabilities (i.e., half-duplexing), and so on. Reduced capability devices may be used in wireless sensor applications with low latency (5-10 ms) and medium data rates (less than 2 Mbps), video transmission (2-25 Mbps), and high data-rate wearables (5-50 Mbps) with long battery life (1-2 weeks).

A contention-free random access procedure involves a base station (BS) issuing a temporarily valid preamble to a UE. The preamble is dedicated to the UE, thus contention resolution is not needed. In other words, the preamble will not be used by UEs which did not get assigned the dedicated preamble. The preamble issued by the BS may be randomly selected from available preambles.

The PRACH preamble size may vary depending on the frequency range. Further, different sizes of PRACH preambles are available for a BS to transmit.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes transmitting, by a wireless communication node to a first wireless communication device, configuration information, wherein the first wireless communication device is a reduced capability user equipment (UE) device, and wherein the configuration information includes a Physical Random Access Channel (PRACH) configuration.

In another embodiment, a method performed by a wireless communication device includes receiving, by a first wireless communication device from a wireless communication node, configuration information, wherein the first wireless communication device is a reduced capability user equipment (UE) device, and wherein the configuration information includes a Physical Random Access Channel (PRACH) configuration.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5A illustrates an example of a starting position of PRACH transmission occasions allocated for transmission for a reduced capability UE, with respect to a starting position of legacy UE PRACH transmission occasions allocated for transmission. FIG. 5B illustrates an example of a starting position of PRACH transmission occasions allocated for transmission for a reduced capability UE, with respect to a starting of legacy UE UL initial bandwidth part allocated for transmission. FIG. 5C illustrates an example of a starting position of PRACH transmission occasions allocated for transmission for a reduced capability UE, with respect to a starting of a legacy UE UL initial bandwidth part allocated for transmission. FIG. 5D illustrates an example of a starting position of PRACH transmission occasions allocated for transmission for a reduced capability UE, with respect to an ending position of a legacy UE PRACH transmission occasion allocated for transmission. FIG. 5E illustrates an example of a starting position of PRACH transmission occasions allocated for transmission for a reduced capability UE, with respect to a position of a resource block. FIG. 5F illustrates an example of a starting position of PRACH transmission occasions allocated for transmission for a reduced capability UE, with respect to a starting position or an ending position of a legacy UE PRACH transmission occasion allocated for transmission, FIG. 6A illustrates an example of a reduced capability UE starting position of initial UL bandwidth part allocated for transmission, with respect to a starting position of a PRACH transmission occasion allocated for transmission for a reduced capability UE. FIG. 6B illustrates an example of a reduced capability UE starting position of initial UL bandwidth part allocated for transmission, with respect to a starting position of a legacy UE UL initial bandwidth part. FIG. 6C illustrates an example of a starting position of reduced capability UE UL initial bandwidth part allocated for transmission, with respect to a position of a resource block.

FIG. 7A illustrates an example of a reconfigured association pattern, in response to different PRACH transmission occasions for reduced capability UEs compared to legacy UEs. FIG. 7B illustrates an example of an association pattern, in response to the same PRACH transmission occasions for reduced capability UEs compared to legacy UEs. FIG. 7C illustrates an example of an association pattern, determined by association pattern of the legacy UE and a factor.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
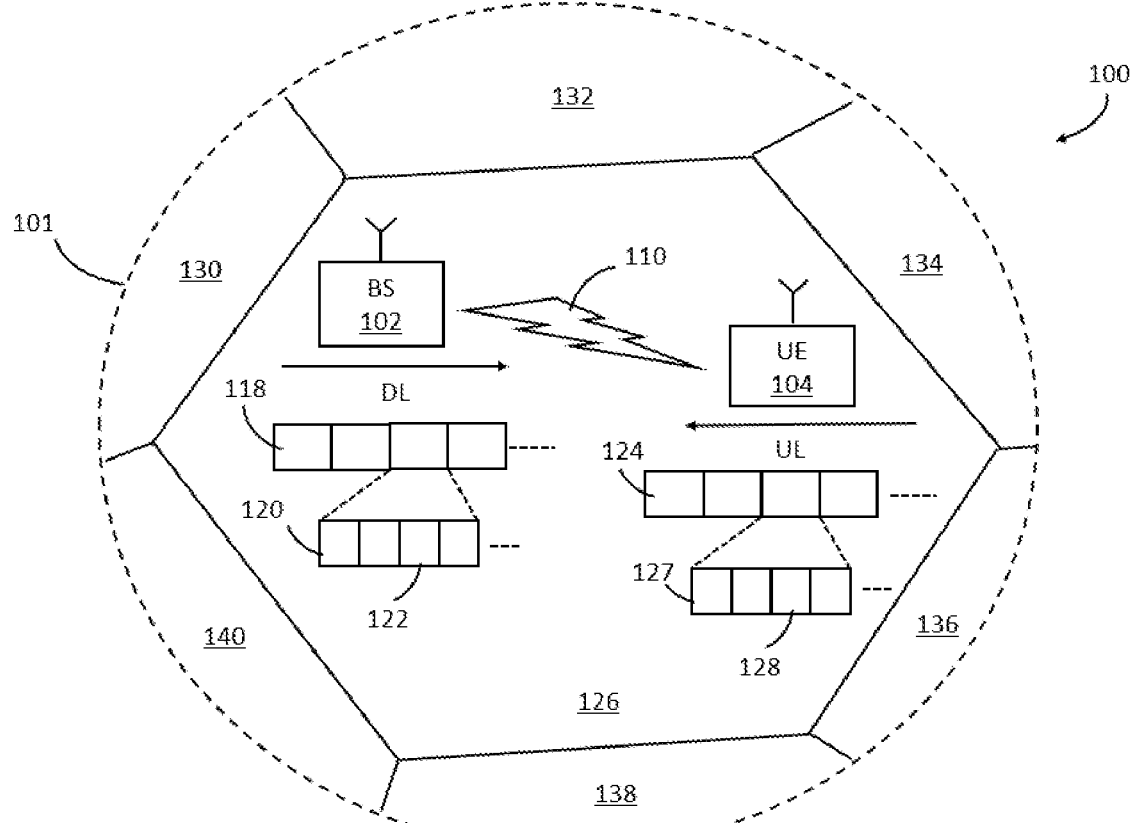
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a NR network, is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figures 2, 3, 4:
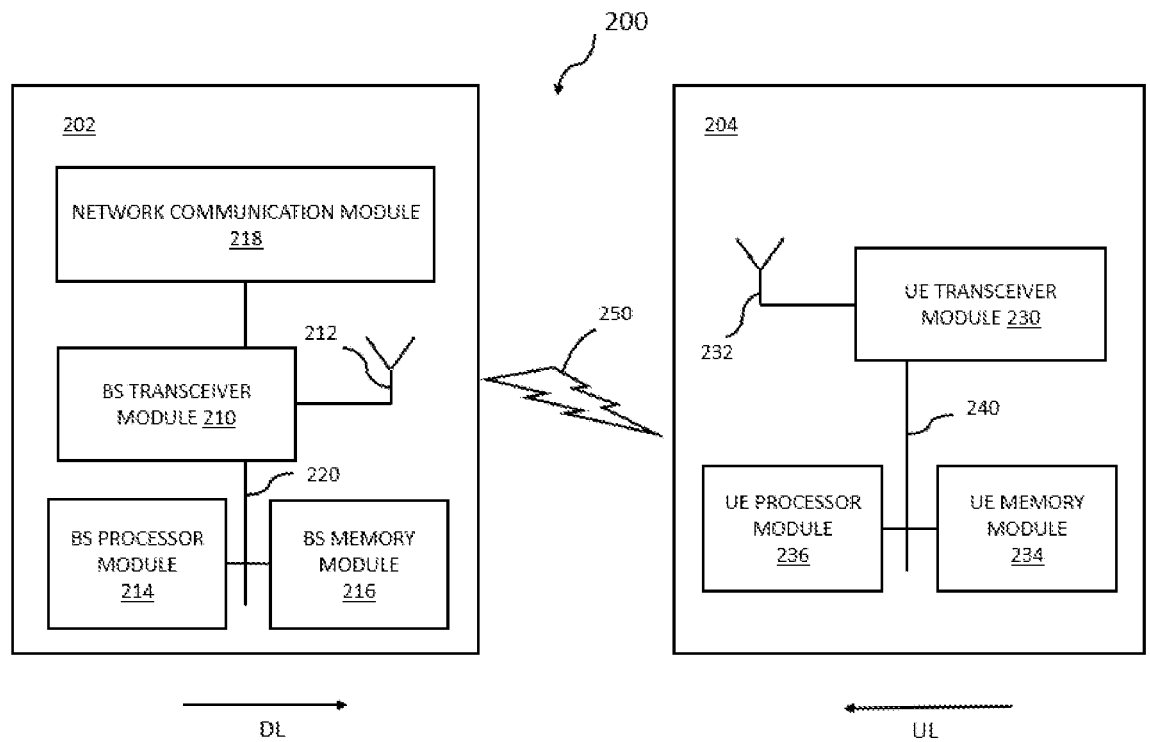
FIG. 2 illustrates block diagrams of an example base station and a user equipment device, in accordance with some embodiments of the present disclosure.
FIG. 3 illustrates a flow chart of an example method of a BS transmitting configuration information, according to some embodiments of the present disclosure.
FIG. 4 illustrates a flow chart of an example method of a reduced capability UE receiving configuration information, according to some embodiments of the present disclosure

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be a Next Generation NodeB (gNB), a serving gNB, a target gNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

As discussed above, a BS may transmit different sizes of PRACH preambles. For example, there may be a long preamble and a short preamble. Table 1 below describes the transmission bandwidths and resource blocks (RB) of PRACH preambles for different subcarrier spacing (SCS) for FR1.

TABLE 1

| Type | SCS (kHz) | Number of RBs | Bandwidth (MHz) |
|---|---|---|---|
| long preamble | 1.25 | 6 | 1.08 |
|  | 5 | 24 | 4.32 |
| short preamble | 15 | 12 | 2.16 |
|  | 30 | 12 | 4.32 |

Similarly, Table 2 below describes the transmission bandwidths and RBs for a short preamble for different SCS in FR2.

TABLE 2

| Type | SCS (kHz) | Number of RBs | Bandwidth (MHz) |
|---|---|---|---|
| short preamble | 60 | 12 | 8.64 |
|  | 120 | 12 | 17.28 |

In a FR1 example, a legacy PRACH configuration may be transmitted to a reduced capability UE. When eight transmission occurrences are multiplexed together (for example, configured with 30 kHz SCS for a short preamble or 5 kHz SCS for a long preamble), the total bandwidth is 34.56 MHz. This bandwidth is larger than the 20 MHz reduced capability bandwidth.

Similarly, in a FR2 example, a legacy PRACH configuration may be transmitted to a reduced capability UE. When eight transmission occurrences are multiplexed together (for example, configured with 120 kNhz SCS for a short preamble), the total bandwidth is 138.24 MHz, larger than the 50/100 MHz for reduced capability UEs. Thus, the bandwidth of reduced capability UEs may be less than the bandwidth configured for legacy UE initial downlink (DL) bandwidth parts and/or legacy UE initial uplink (UL) bandwidth parts. The size of the initial UL bandwidth parts and initial DL bandwidth parts is a fixed value in FR1 and FR2.

In NR, an eight-bit PRACH configuration index may be used to signal the PRACH time domain parameter and PRACH preamble format. PRACH preamble formats in NR include 0-3, A1, A1/B1, A2, A2/B2, B2, A3/B3, B1, B4, C0 and C2. In some embodiments, twenty-eight PRACH time domain parameters may be configured for a given PRACH preamble format.

A reduced capability UE may retune a Random Access Channel (RACH) occasion corresponding to the best synchronization signal block (SSB) beam to transmit a PRACH preamble in the event that the total bandwidth of the RACH occasion in the time domain is larger than the bandwidth of the reduced capability UEs. However, the BS does not have information to determine whether the UE is a legacy UE or a reduced capability UE. Thus, in the event that a BS transmits a PRACH configuration intended for a legacy UE (hereinafter "legacy PRACH configuration") instead of a reduced capability UE, the BS may inadvertently schedule the transmission of reduced capability UEs out of the transmission scope during the initial access procedure.

Further, communication disruptions may occur in the event that Random Access Response (RAR) messages of massive reduced capability UEs are scheduled in the same Random Access (RA) common search space (CSS) as legacy UEs.

Thus, a dedicated PRACH configuration may be considered for reduced capability UEs. A BS may transmit configuration information to a reduced capability UE. The configuration information may include a PRACH configuration. The reduced capability UE may receive a PRACH configuration in configuration information.

FIG. 3 illustrates a flow chart of an example method of a BS transmitting configuration information, according to some embodiments of the present disclosure. As described in 301, a BS may transmit configuration information to a reduced capability UE. The configuration information may include a PRACH configuration, where the PRACH configuration may consider the starting position of PRACH transmission occasion, the starting position of initial UL bandwidth parts, the number of PRACH transmission occasions, the PRACH transmission occasions in time domain, the PRACH configuration index, and an association pattern.

FIG. 4 illustrates a flow chart of an example method of a reduced capability UE receiving configuration information, according to some embodiments of the present disclosure. As described in 401, a reduced capability UE may receive configuration information from a BS. The configuration information may include a PRACH configuration, where the PRACH configuration may consider the starting position of PRACH transmission occasion, the starting position of initial UL bandwidth parts, the number of PRACH transmission occasions, the PRACH transmission occasions in time domain, the PRACH configuration index, and an association pattern.

1. Starting Position of PRACH Transmission Occasions

In some embodiments, the starting position of a PRACH transmission occasion for a reduced capability UE may be included in the PRACH configuration information. In some embodiments, the starting position of a PRACH transmission occasion for a reduced capability UE may be determined according to be the starting position of the PRACH transmission occasion for legacy UEs. In one embodiment, the starting position of the PRACH transmission occasion allocated for transmission for a reduced capability UE may be in the frequency domain. In one embodiment, a number of offset resource blocks may indicate the starting position of the PRACH transmission occasion.

Figure 5A:
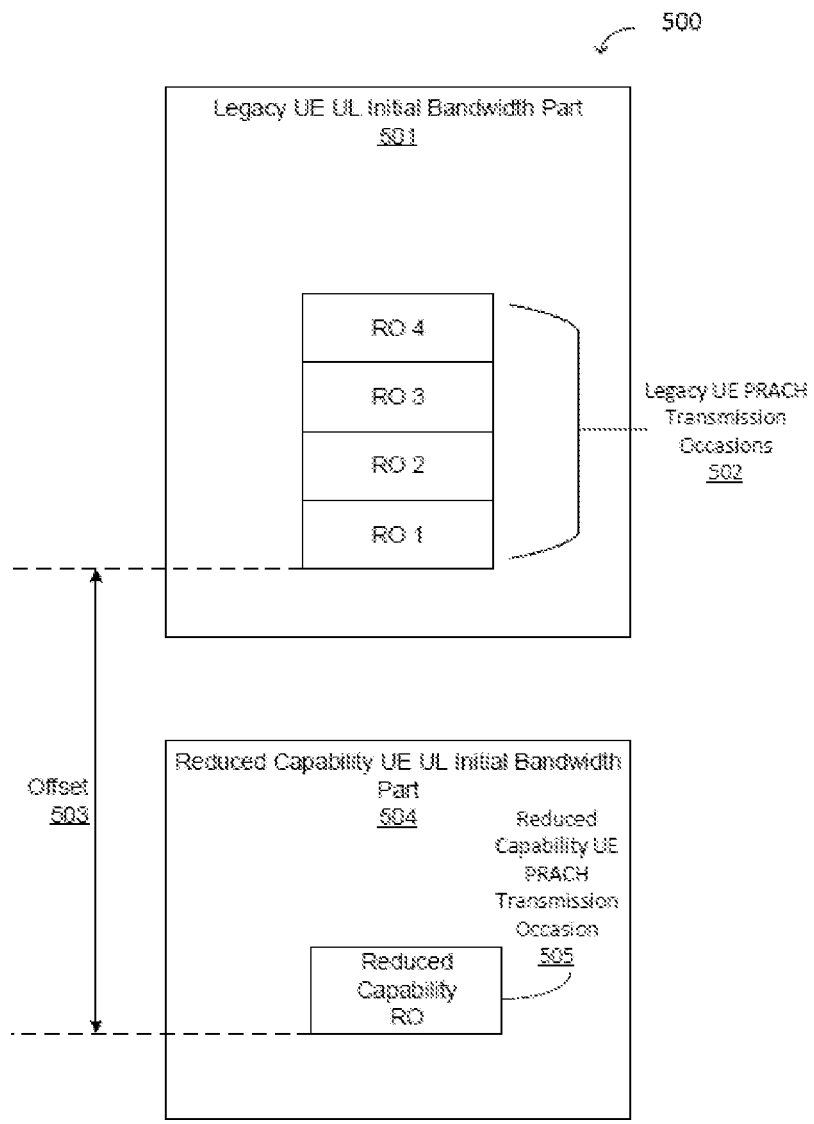
FIGS. 5A-5F illustrate example starting positions of PRACH transmission occasions allocated for transmission for reduced capability UEs, according to some embodiments of the present disclosure.

FIG. 5A illustrates an example 500 of a starting position of PRACH transmission occasions allocated for transmission for a reduced capability UE, with respect to a starting position of legacy UE PRACH transmission occasions allocated for transmission, according to some embodiments of the present disclosure. The reduced capability UE transmission occasion 505 may be located in the reduced capability UE UL initial bandwidth part 504. The reduced capability UE PRACH transmission occasion 505 is offset 503 from the starting position of legacy UE PRACH transmission occasions 502. The offset 503 may be measured in resource blocks. The legacy UE transmission occasions 502 is located in the legacy UE UL initial bandwidth part 501.

Figure 5B:
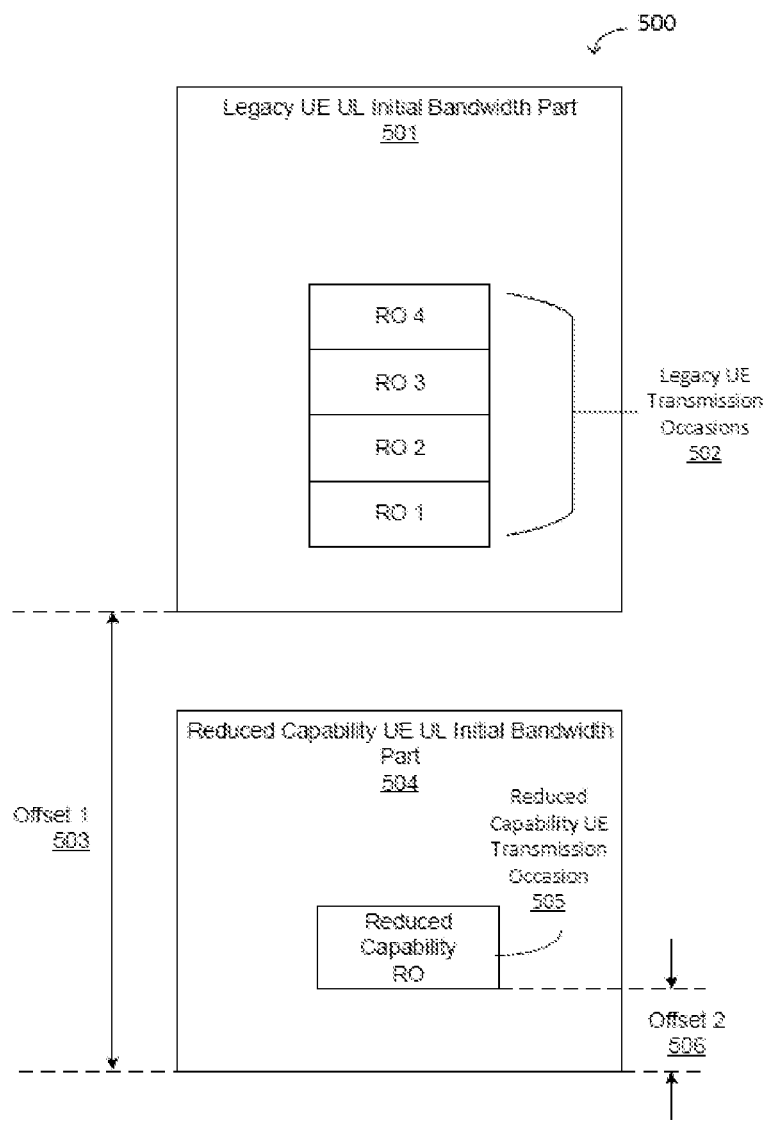

FIG. 5B illustrates an example 500 of a starting position of PRACH transmission occasions allocated for transmission for a reduced capability UE, with respect to a starting of legacy UE UL initial bandwidth part allocated for transmission, according to some embodiments of the present disclosure. The reduced capability UE PRACH transmission occasion 505 may be located in the reduced capability UE UL initial bandwidth part 504. The reduced capability UE PRACH transmission occasion 505 is offset 1 503 from the starting of the legacy UE UL initial bandwidth part 501 and not the legacy UE transmission occasions 502 as shown in FIG. 5A. Offset 1 may be measured in resource blocks. Further, the reduced capability UE PRACH transmission occasion 505 may be offset 2 506 from the starting of a reduced capability UE UL initial bandwidth part 504. Offset 2 506 may be measured in resource blocks.

Figure 5C:
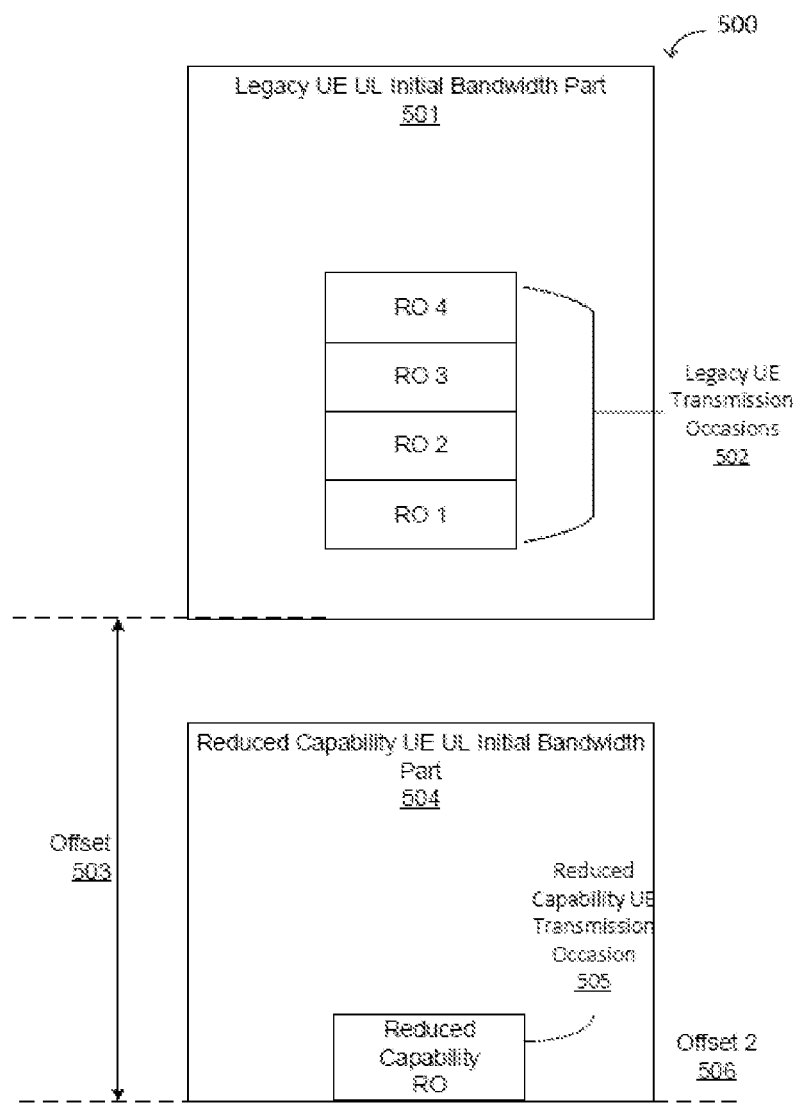

FIG. 5C illustrates an example 500 of a starting position of PRACH transmission occasions allocated for transmission for a reduced capability UE, with respect to a starting of a legacy UE UL initial bandwidth part allocated for transmission, according to some embodiments of the present disclosure. Similarly to FIG. 5B, the reduced capability UE PRACH transmission occasion 505 may be located in the reduced capability UE UL initial bandwidth part 504. The reduced capability UE PRACH transmission occasion 505 may be offset 1 503 from the starting of the legacy UE UL initial bandwidth part 501. Offset 1 may be measured in resource blocks. Further, the reduced capability UE transmission occasion 505 may be offset 2 506 from the starting of a reduced capability UE UL initial bandwidth part 504. Offset 2 506 may be measured in resource blocks. In some embodiments, the default offset 2 506 may be zero resource blocks. FIG. 5C, as shown, indicates the start position of reduced capability UE PRACH transmission occasion 505 is equal to the starting position of the legacy UE UL initial bandwidth part 501.

Figure 5D:
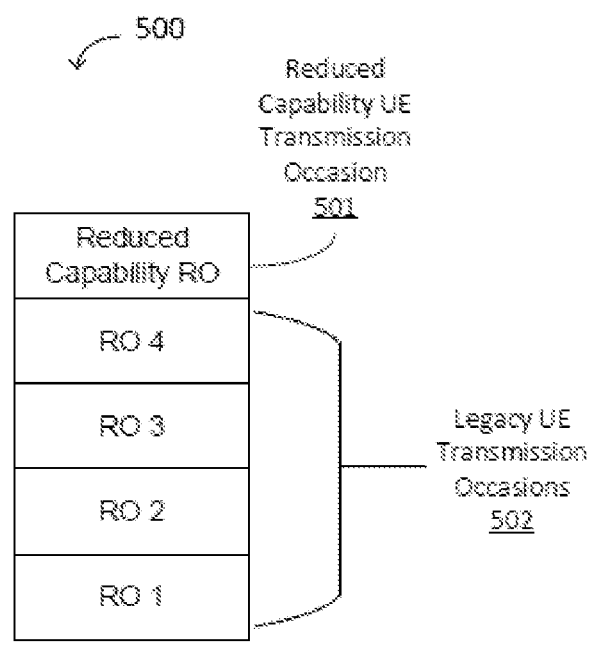

FIG. 5D illustrates an example 500 of a starting position of PRACH transmission occasions allocated for transmission for a reduced capability UE, with respect to an ending position of a legacy UE PRACH transmission occasion allocated for transmission, according to some embodiments of the present disclosure. The starting position of the reduced capability UE PRACH transmission occasion 501 may be a fixed offset to a starting position of a legacy UE PRACH transmission occasion 502. In alternate embodiments, the starting position reduced capability UE PRACH transmission occasion 501 may be a fixed offset to an ending position of a legacy UE PRACH transmission occasion (not shown). The fixed offset may be measured in resource blocks. In some embodiments, the fixed offset may be zero resource blocks. In some embodiments, the fixed offset may be equal to the size of an initial bandwidth part for the reduced capability UE. FIG. 5D, as shown, indicates the fixed offset to the ending position of the legacy UE transmission occasions as zero.

In some embodiments, the reduced capability UE may receive a signal indicator from the BS. In some embodiments, the signal indicator may be 1-bit. In some embodiments, responsive to the reduced capability UE receiving the signal indicator, the reduced capability UE may determine a starting position of the PRACH transmission occasion to be determined by a fixed offset to an ending position of a legacy UE PRACH transmission occasion. In some embodiments, responsive to the reduced capability UE receiving the signal indicator, the reduced capability UE may determine a starting position of the PRACH transmission occasion to be determined by a fixed offset to a starting position of a legacy UE PRACH transmission occasion. In some embodiments, the fixed offset may be zero resource blocks. In some embodiments, the fixed offset may be equal to the size of an initial bandwidth part for the reduced capability UE.

Figure 5E:
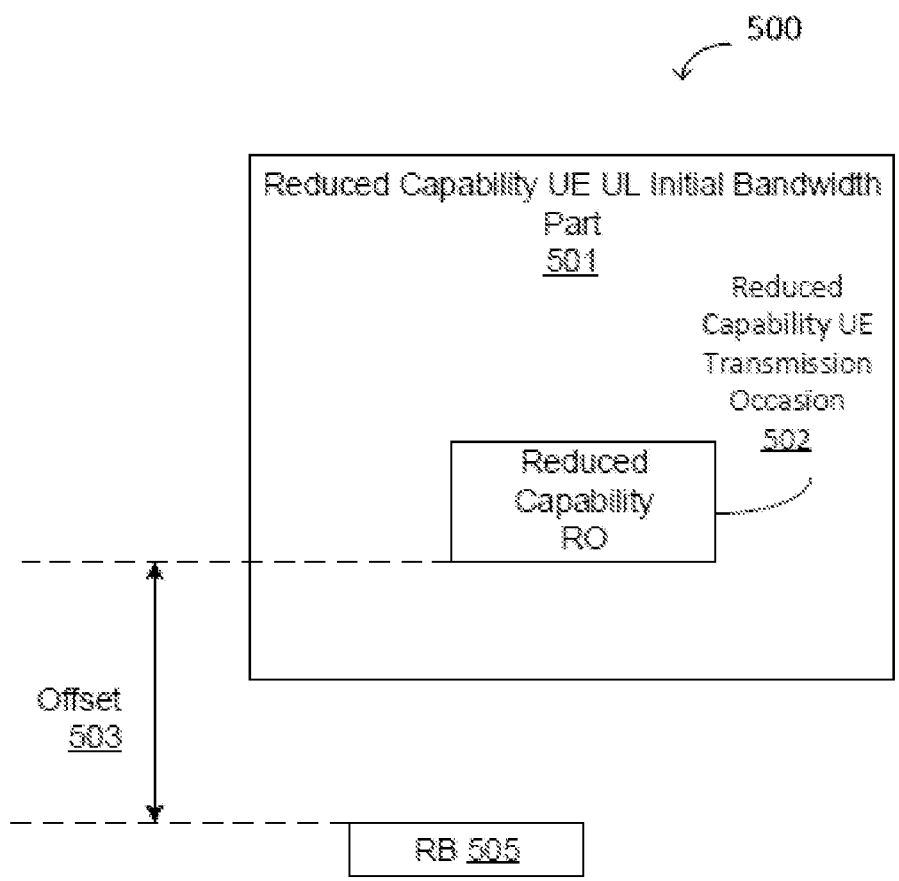

FIG. 5E illustrates an example 500 of a starting position of PRACH transmission occasions allocated for transmission for a reduced capability UE, with respect to a starting of a resource block, according to some embodiments of the present disclosure. The reduced capability UE PRACH transmission occasion 502 may be located in the reduced capability UE UL initial bandwidth part 501. The reduced capability UE transmission occasion 502 is offset 503 from a reference resource block 505. Offset 503 may be measured in resource blocks.

Figure 5F:
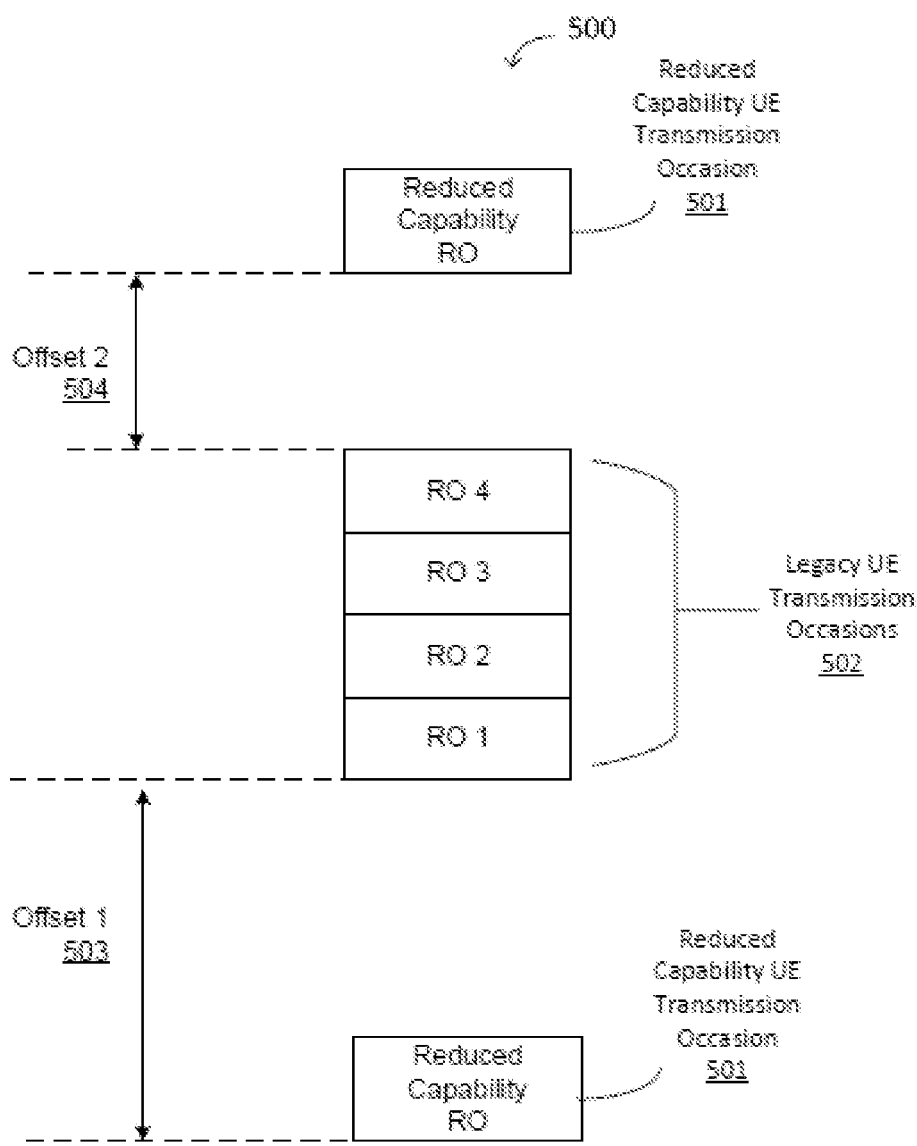

FIG. 5F illustrates an example 500 of a starting position of PRACH transmission occasions allocated for transmission for a reduced capability UE, with respect to a starting position or an ending position of a legacy UE PRACH transmission occasion allocated for transmission, according to some embodiments of the present disclosure. The starting position of the reduced capability UE PRACH transmission occasion 501 may be a distance that is the absolute value of an offset away from a starting position of a legacy UE PRACH transmission occasion. Offset 1 503 shows the absolute value of a negative offset. In some embodiments, the offset may be the absolute value of a positive offset. The absolute value of the offset may be measured in resource blocks.

In alternate embodiments, the starting position of the reduced capability UE PRACH transmission occasion 501 may be a distance that is the absolute value of an offset away from an ending position of a legacy UE PRACH transmission occasion. Offset 2 504 shows the absolute value of a positive offset. In some embodiments, the offset may be the absolute value of a negative offset. The absolute value of the offset may be measured in resource blocks. FIG. 5F, as shown, indicates the absolute value of offset to the starting position or ending position of the legacy UE transmission occasions as zero.

2. Starting Position of UL Initial Bandwidth Part

In some embodiments, a starting position of an uplink initial bandwidth part allocated for transmission may be included in the configuration information. The starting position of an uplink initial bandwidth part may be in the frequency domain.

Figure 6A:
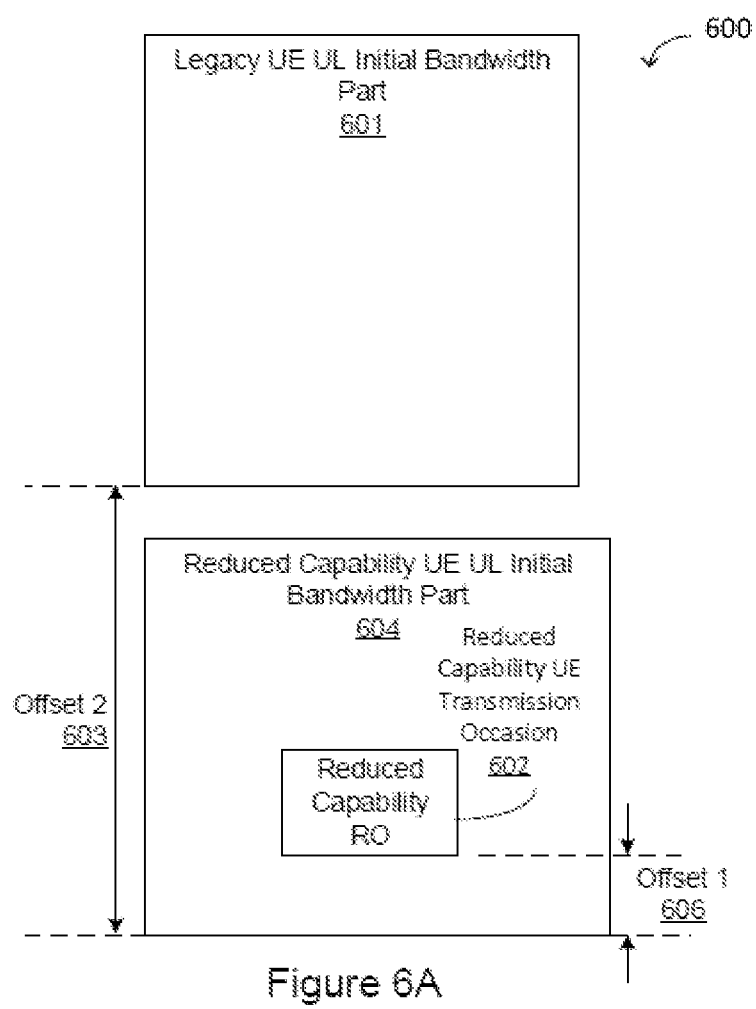
FIGS. 6A-6C illustrate example reduced capability UE starting positions of initial UL bandwidth part allocated for transmission, according to some embodiments of the present disclosure.

FIG. 6A illustrates an example 600 of a reduced capability UE starting position of initial UL bandwidth part allocated for transmission, with respect to a starting position of PRACH transmission occasion allocated for transmission for a reduced capability UE, according to some embodiments of the present disclosure. The reduced capability UE starting position of the UL initial bandwidth part 604 may be offset 2 603 from the starting of the legacy UE UL initial bandwidth part 601. Offset 2 603 may be measured in resource blocks. In some embodiments, the default offset may be equal to the size of the reduced capability UE. Further, the reduced capability UE transmission occasion 602 may be offset 1 606 from the reduced capability UE starting position of initial UL bandwidth part 604. Offset 1 606 may be measured in resource blocks. In some embodiments, the default offset may be zero resource blocks.

Figure 6B:
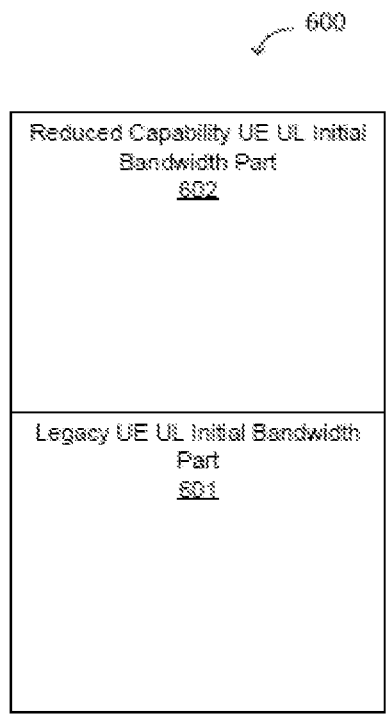

FIG. 6B illustrates an example 600 of a reduced capability UE starting position of initial UL bandwidth part allocated for transmission, with respect to an ending position of a legacy UE UL initial bandwidth part, according to some embodiments of the present disclosure. The reduced capability UE starting position of the UL initial bandwidth part 602 may be adjacent to an ending position of a legacy UE UL initial bandwidth part.

Figure 6C:
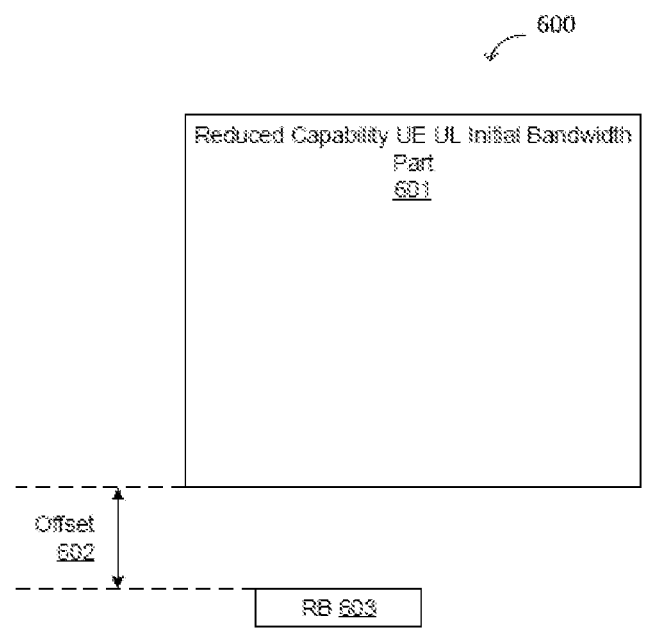

FIG. 6C illustrates an example 600 of a starting position of reduced capability UE UL initial bandwidth part allocated for transmission, with respect to a position of a resource block, according to some embodiments of the present disclosure. The reduced capability UE UL initial bandwidth part 601 is offset 602 from a reference resource block 603. The offset may be measured in resource blocks.

3. Number of PRACH Transmission Occasions

In some embodiments, a number of PRACH transmission occasions allocated for transmission for a reduced capability UE may be included in the PRACH configuration information. A default number of PRACH transmission occasions for the reduced capability UE in the frequency domain may be predefined to one. In alternate embodiments, the number of PRACH transmission occasions for the reduced capability UE may be two or four.

4. PRACH Transmission Occasions in Time Domain

In some embodiments, the number of PRACH transmissions in a time domain may be included in the PRACH configuration information. In some embodiments, the PRACH preamble is transmitted in one or more PRACH transmission occasions.

In some embodiments, the number of PRACH transmission occasions in a time domain for a reduced capability UE may be indicated in the PRACH configuration via a reduced capability UE PRACH configuration period. In some embodiments, reduced capability UE PRACH configuration period may be determined by the legacy UE PRACH configuration index. The PRACH configuration index may indicate the legacy UE PRACH configuration period. In other embodiments, the reduced capability UE PRACH configuration period may be determined based on a legacy UE PRACH configuration period. The legacy UE PRACH configuration period may be indicated by a legacy UE PRACH configuration index.

In some embodiments, the number of PRACH transmission occasions used for transmitting the PRACH configuration to the reduced capability UE is determined based on a PRACH configuration period. The PRACH configuration period for a reduced capability UE may be found by Equation 1 below.

$$X_2 = X_1 * \left\lceil \frac{N_2}{N_1} \right\rceil \quad \text{Equation 1}$$

In Equation 1, $X_2$ is the reduced capability UE PRACH configuration period, $X_1$ is the legacy UE PRACH configuration period, $N_2$ is a number of PRACH transmission occasions in the frequency domain for reduced capability UEs, and $N_1$ is a number of PRACH transmission occasions in the frequency domain for legacy UEs. A subframe number for the PRACH transmissions for the reduced capability UE may be acquired from the PRACH configuration index configured for legacy UEs.

Table 3 below may be used in one example.

TABLE 3

| PRACH Configuration Index | Preamble format | $n_{SFN}$ mod x = y | | Subframe number |
|---|---|---|---|---|
| | | x | y | |
| 0 | 0 | 16 | 1 | 1 |
| 4 | 0 | 8 | 1 | 1 |
| 8 | 0 | 4 | 1 | 1 |
| 12 | 0 | 2 | 1 | 1 |

In the above example, a PRACH preamble format 0 and a PRACH configuration index 0 may be configured. If $$\frac{N_1}{N_2} = 4,$$

then the reduced capability UE may determine that the PRACH configuration index 8 may be configured for the reduced capability UE. Alternatively, if $$\frac{N_1}{N_2} = 2,$$

then the reduced capability UE may determine that the PRACH configuration index 4 may be configured for the reduced capability UE.

In alternate embodiments, for the reduced capability UE, the number of PRACH transmission occasions associated with one SSB used for transmitting the PRACH preamble to the BS may be determined by a repetition requirement. The repetition requirement, determined by the BS, may indicate a number of PRACH preambles sent from the reduced capability UE in consecutive PRACH transmission occasions associated with the same SSB block(s) to the BS.

Thus, the PRACH configuration period for a reduced capability UE may be found in Equation 2 below:

$$X_2 = X_1 * \left\lceil \frac{N_2}{N_1 * M} \right\rceil \quad \text{Equation 2}$$

Similarly to Equation 1, Equation 2 describes $X_2$ as the reduced capability UE PRACH configuration period, $X_1$ as the legacy UE PRACH configuration period, $N_2$ as a number of PRACH transmission occasions in the frequency domain for reduced capability UEs, M as the repetition requirement, and $N_1$ as a number of PRACH transmission occasions in the frequency domain for legacy UEs. A subframe number for the PRACH transmissions for the reduced capability UE may be acquired from the PRACH configuration index configured for legacy UEs.

Table 4 below may be used in one example.

TABLE 4

| PRACH Configuration Index | Preamble format | $n_{SFN}$ mod x = y | | Subframe number |
|---|---|---|---|---|
| | | x | y | |
| 0 | 0 | 16 | 1 | 1 |
| 4 | 0 | 8 | 1 | 1 |
| 8 | 0 | 4 | 1 | 1 |
| 12 | 0 | 2 | 1 | 1 |
| 16 | 0 | 1 | 0 | 1 |
| 19 | 0 | 1 | 0 | 1, 6 |
| 22 | 0 | 1 | 0 | 1, 4, 7 |
| 26 | 0 | 1 | 0 | 1, 3, 5, 7, 9 |
| 27 | 0 | 1 | 0 | 0, 1, 2, 3, 4, 5, 6, 7, 8, 9 |

In the above example, a PRACH preamble format 0 and a PRACH configuration index 0 may be configured. If $$\frac{N_1}{N_2} = 4,$$

and M=2, then the reduced capability UE may determine that the PRACH configuration index 12 may be configured for the reduced capability UE. Alternatively, if $$\frac{N_1}{N_2} = 4$$

and M=4, then the reduced capability UE may determine that the PRACH configuration index 16 may be configured for the reduced capability UE.

5. PRACH Configuration Index

In some embodiments, a relative PRACH configuration index may be included in the PRACH configuration. The relative PRACH configuration index may indicate a PRACH time domain parameter corresponding to a PRACH preamble format used in a legacy UE device. In other words, the legacy UE PRACH configuration index may be reused for reduced capability UEs. In some embodiments, the PRACH configuration index may be indicated using five-bits.

Table 5 may be used in one example.

TABLE 5

| PRACH Configuration Index | Preamble format | $n_{SFN}$ mod x = y | | Subframe number | Relative PRACH configuration index for Reduced Capability UEs |
|---|---|---|---|---|---|
| | | x | y | | |
| 198 | B4 | 16 | 0 | 4, 9 | 0 |
| 199 | B4 | 16 | 1 | 4 | 1 |
| 200 | B4 | 8 | 0 | 4, 9 | 2 |
| 201 | B4 | 8 | 1 | 4 | 3 |
| 202 | B4 | 4 | 0 | 4, 9 | 4 |
| 203 | B4 | 4 | 0 | 4 | 5 |

TABLE 5-continued

| PRACH Configuration Index | Pre-amble format | $n_{SFN}$ mod x = y | | Subframe number | Relative PRACH configuration index for Reduced Capability UEs |
|---|---|---|---|---|---|
| | | x | y | | |
| 204 | B4 | 4 | 1 | 4, 9 | 6 |
| 205 | B4 | 2 | 0 | 4, 9 | 7 |
| 206 | B4 | 2 | 0 | 1 | 8 |
| 207 | B4 | 2 | 0 | 4 | 9 |
| 208 | B4 | 2 | 0 | 7 | 10 |
| 209 | B4 | 1 | 0 | 1 | 11 |
| 210 | B4 | 1 | 0 | 4 | 12 |
| 211 | B4 | 1 | 0 | 7 | 13 |
| 212 | B4 | 1 | 0 | 1, 6 | 14 |
| 213 | B4 | 1 | 0 | 2, 7 | 15 |
| 214 | B4 | 1 | 0 | 4, 9 | 16 |
| 215 | B4 | 1 | 0 | 1, 4, 7 | 17 |
| 216 | B4 | 1 | 0 | 0, 2, 4, 6, 8 | 18 |
| 217 | B4 | 1 | 0 | 0, 1, 2, 3, 4, 5, 6, 7, 8, 9 | 19 |
| 218 | B4 | 1 | 0 | 1, 3, 5, 7, 9 | 20 |

In the above example, PRACH configuration indices 198-218 may indicate the PRACH configuration for the PRACH preamble format B4. The relative PRACH configuration indices 0-20 may be used to indicate the PRACH time domain parameters corresponding to the PRACH preamble format. The PRACH preamble format may be the preamble format for a legacy UE that is indicated by an 8-bit PRACH configuration index.

In some embodiments, the PRACH configuration index for the reduced capability UEs may be determined according to the subframe number for PRACH transmissions from the PRACH configuration index configured for legacy UEs.

6. Association Pattern

In some embodiments, an association pattern may be included in the PRACH configuration information. The association pattern is a mapping rule that maps one or more SSBs, transmitted in DL, to a reduced capability UE PRACH transmission occasion during an association pattern period for the reduced capability UE. The PRACH transmission occasion for reduced capability UEs may or may not be in the same UL bandwidth part as legacy UEs. Thus, the association pattern may map one or more SSBs to the PRACH transmission occasions dedicated to the reduced capability UE. The reduced capability UE may map the association pattern during an association period.

Figure 7A:
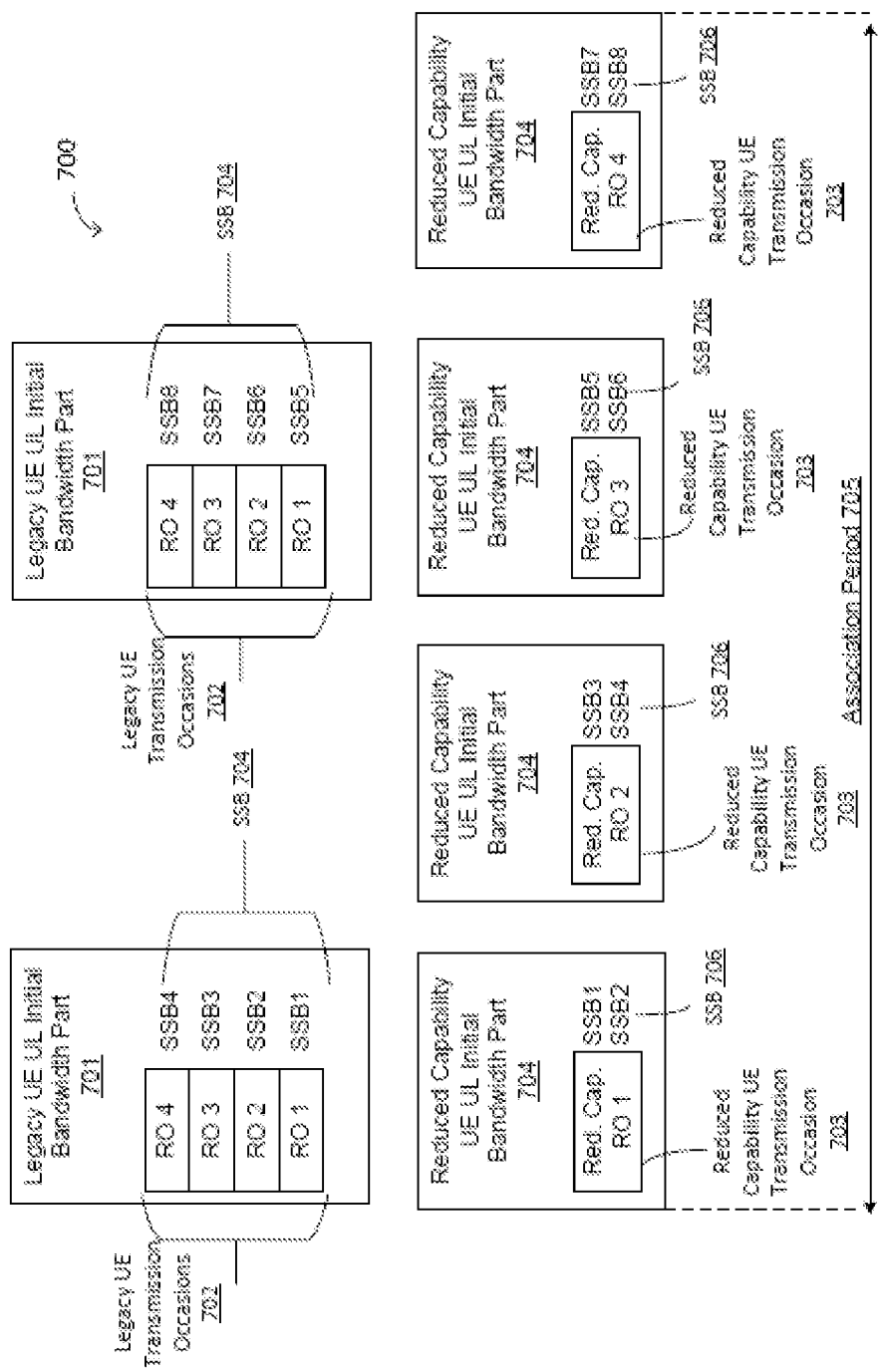
FIGS. 7A-7C illustrate example association patterns in association periods, according to some embodiments of the present disclosure.

FIG. 7A illustrates an example 700 of a reconfigured association pattern, in response to different PRACH transmission occasions for reduced capability UEs compared to legacy UEs, according to one or more embodiments of the present disclosure. As shown, the total number of time and frequency PRACH transmission occasions allocated for the reduced capability UE are different from the total number of time and frequency PRACH transmission occasions allocated for the legacy UE. In the event the total number of time and frequency PRACH transmission occasions for reduced capability UEs are not the same as the total number of time and frequency PRACH transmission occasions for legacy UEs, an association pattern may be configured mapping SSB to PRACH transmission occasions in an association pattern period 705. The association pattern, configured in the association pattern period 704, maps SSBs dedicated for the reduced capability UE 706 blocks to reduced capability UE PRACH transmission occasion 703 in the reduced capability UE UL initial bandwidth part 704. For example, two SSBs dedicated for the reduced capability UE 706 (SSB1 and SSB2) are mapped to one reduced capability UE transmission occasion (Red. Cap. RO 1). In contrast, one SSB used in the legacy UE 704 is mapped to legacy UE transmission occasions 702 in the legacy UE UL initial bandwidth part 701. For example, SSB 704 used in the legacy UE (SSB1) is mapped to the legacy UE transmission occasion 702 (RO 1).

In some embodiments, the total number of time PRACH transmission occasions for reduced capability UEs may not be the same as the total number of time PRACH transmission occasions for legacy UEs. In other embodiments, the total number of frequency PRACH transmission occasions for reduced capability UEs may not be the same as the total number of frequency PRACH transmission occasions for legacy UEs.

In the event the total number of time and frequency transmission occasions for reduced capability UEs are the same as the total number of time and frequency PRACH transmission occasions for legacy UEs, the same association pattern configured for the legacy UE may be reused for the reduced capability UE. In other words, if the total number of time and frequency PRACH transmission occasions for reduced capability UEs are the same as the total number of time and frequency PRACH transmission occasions for legacy UEs, the reduced capability UE may not need to configure a dedicated association pattern. The reduced capability UE may assume that the association pattern to be used is the same as that of the legacy UE. The legacy UE association pattern may be predefined.

Figure 7B:
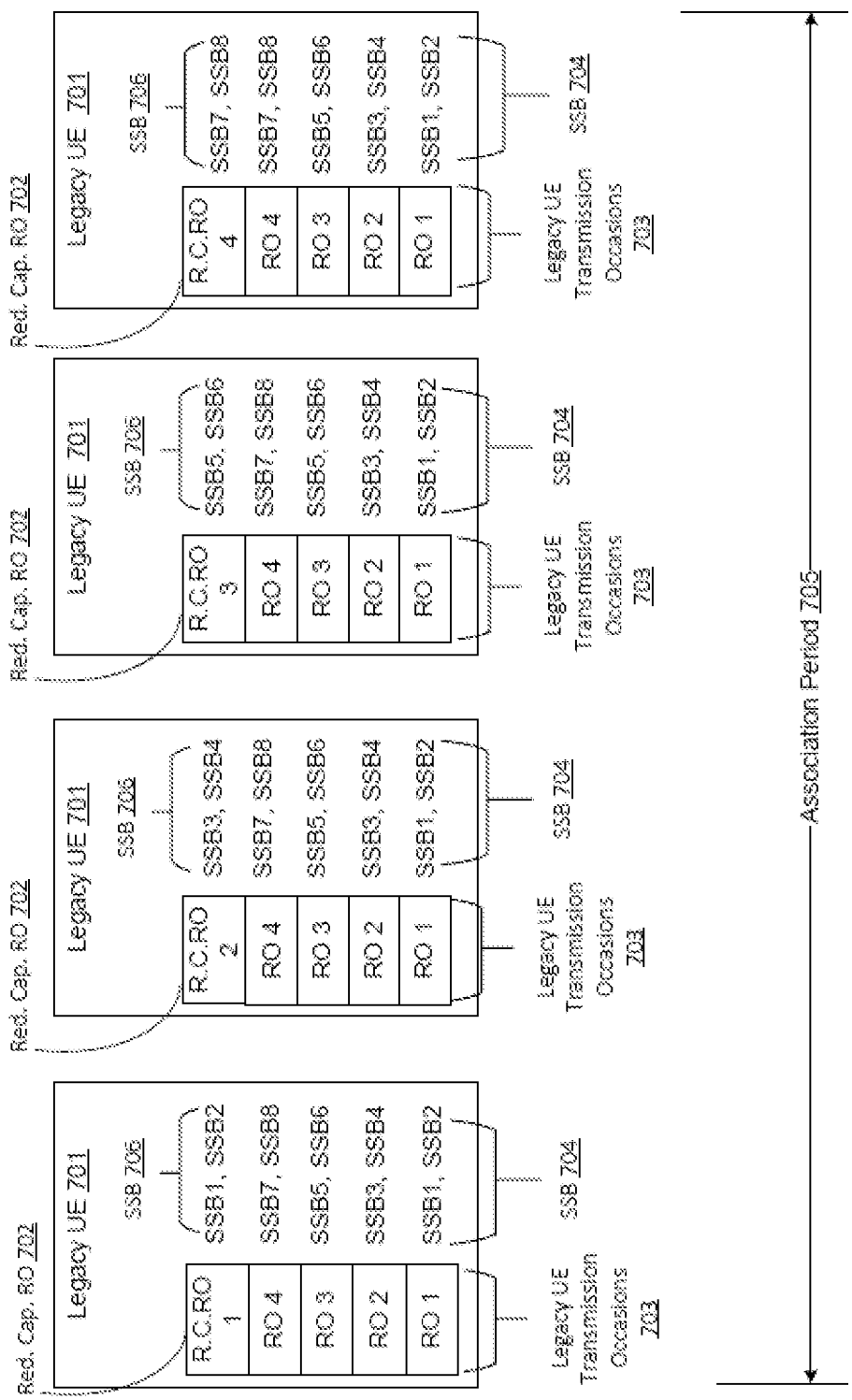

FIG. 7B illustrates an example 700 of an association pattern, in response to the same PRACH transmission occasions for reduced capability UEs compared to legacy UEs, according to one or more embodiments of the present disclosure. As shown, the total number of time and frequency PRACH transmission occasions allocated for the reduced capability UE are the same as the total number of time and frequency PRACH transmission occasions allocated for the legacy UE.

The association pattern, mapping legacy UE PRACH transmission occasions 703 in the legacy UE UL initial bandwidth part 701 to SSBs used in the legacy UE 704 in the association period 705 may be reused for the reduced capability UE. In other words, reduced capability UE PRACH transmission occasions 702 may be mapped to SSBs dedicated for the reduced capability UE 706. For example, one legacy UE PRACH transmission occasion 703 (RO 1) is mapped to two SSBs used in the legacy UE 704 (SSB1 and SSB2). Similarly, reduced capability UE PRACH transmission occasion 702 (R.C.RO 1) is mapped to two SSBs dedicated for the reduced capability UE 706 (SSB1 and SSB2).

Figure 7C:
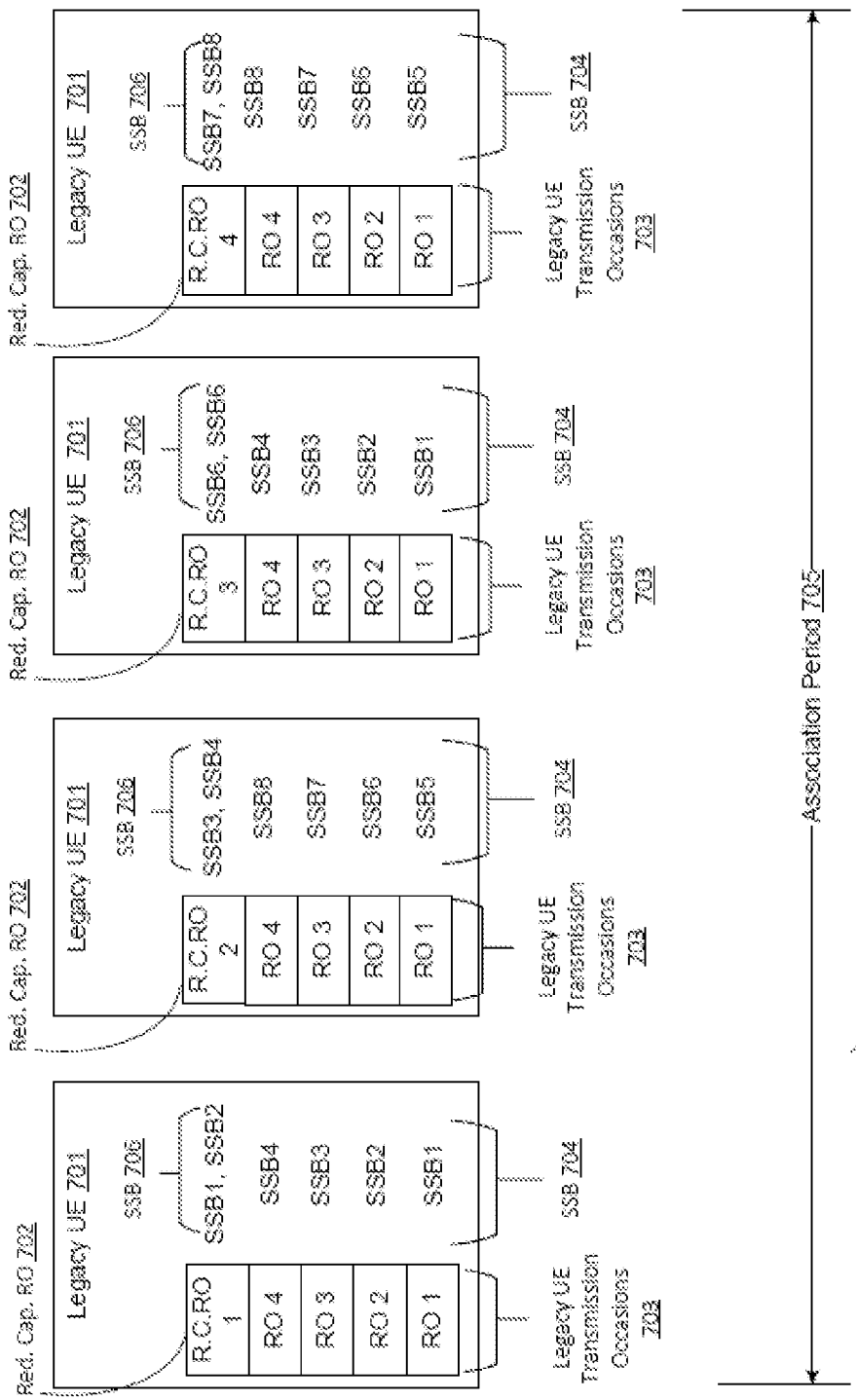

FIG. 7C illustrates an example 700 of an association pattern, determined by association pattern of the legacy UE and a factor, according to one or more embodiments of the present disclosure. Equation 3 below describes the association pattern of a reduced capability UE with a factor.

$$N_2 = N_1 * f \qquad \text{Equation 3}$$

In Equation 3 above, $N_2$ may be the SS/PBCH blocks associated with one PRACH transmission occasion for reduced capability UEs, $N_1$ may be the number of SS/PBCH blocks associated with one PRACH transmission occasion for legacy UEs, and f may be a factor. In some embodiments, the factor may be configured by the base station according to the number of PRACH transmission occasions configured to the reduced capability UE and a target association pattern. In some embodiments, the factor f may be configured to 1, 2, 4 or 8.

FIG. 7C, as shown, assumes f=2. The association pattern, mapping legacy UE PRACH transmission occasions 703 in the legacy UE UL initial bandwidth part 701 to SSBs used in the legacy UE 704 in the association period 705 may be reused with the factor for the reduced capability UE. In other words, reduced capability UE PRACH transmission occasions 702 may be mapped to SSBs dedicated for the reduced capability UE 706. For example, one legacy UE PRACH transmission occasion 703 (RO 1) is mapped to one SSB used in the legacy UE 704 (SSB1). The factor modifies the association pattern, causing one reduced capability UE PRACH transmission occasion 702 (R.C.RO 1) to be mapped to two SSBs dedicated for the reduced capability UE 706 (SSB1 and SSB2).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
transmitting, by a wireless communication node to a first wireless communication device, configuration information,
wherein the first wireless communication device is a reduced capability user equipment (UE) device, and wherein the configuration information includes a Physical Random Access Channel (PRACH) configuration including a starting position of a PRACH transmission occasion allocated for the first wireless communication device in frequency domain, and wherein the starting position of the PRACH transmission occasion allocated for the first wireless communication device is indicated by a number of offset resource blocks away from a starting of an uplink initial bandwidth part allocated for at least one of the first wireless communication device or a second wireless communication device, wherein the starting of the uplink initial bandwidth part allocated for the first wireless communication device is adjacent to an ending position of the uplink initial bandwidth part allocated for the second wireless communication device.

2. The wireless communication method of claim 1, wherein the number of offset resource blocks is away from the starting of the uplink initial bandwidth part allocated for the first wireless communication device.

3. The wireless communication method of claim 1, wherein the number of offset resource blocks is away from the starting of the uplink initial bandwidth part allocated for the second wireless communication device.

4. The wireless communication method of claim 1, wherein the PRACH configuration includes a number of PRACH transmission occasions allocated for the first wireless communication device in frequency domain, wherein the number of PRACH transmission occasions allocated includes one of: one PRACH transmission occasion, two PRACH transmission occasions or four PRACH transmission occasions.

5. The wireless communication method of claim 1, wherein the PRACH configuration includes a number of PRACH transmission occasions in time domain.

6. The wireless communication method of claim 1, wherein a PRACH preamble is transmitted in one or more PRACH transmission occasions.

7. The wireless communication method of claim 1, wherein the PRACH configuration includes a relative PRACH configuration index, the relative PRACH configuration index indicating a PRACH time domain parameter corresponding to a PRACH preamble format, the PRACH preamble format configured for the second wireless communication device.

8. The wireless communication method of claim 1, wherein the PRACH configuration includes an association pattern, wherein the association pattern maps one or more synchronization signal blocks (SSBs) to a PRACH transmission occasion during an association pattern period for the first wireless communication device.

9. A wireless communication node comprising:
at least one processor configured to:
transmit, via a transmitter to a first wireless communication device, configuration information,
wherein the first wireless communication device is a reduced capability user equipment (UE) device, and wherein the configuration information includes a Physical Random Access Channel (PRACH) configuration including a starting position of a PRACH transmission occasion allocated for the first wireless communication device in frequency domain, and wherein the starting position of the PRACH transmission occasion allocated for the first wireless communication device is indicated by a number of offset resource blocks away from a starting of an uplink initial bandwidth part allocated for at least one of the first wireless communication device or a second wireless communication device, wherein the starting of the uplink initial bandwidth part allocated for the first wireless communication device is adjacent to an ending position of the uplink initial bandwidth part allocated for the second wireless communication device.

10. The wireless communication node of claim 9, wherein the number of offset resource blocks is away from the starting of the uplink initial bandwidth part allocated for the first wireless communication device.

11. The wireless communication node of claim 9, wherein the number of offset resource blocks is away from the starting of the uplink initial bandwidth part allocated for the second wireless communication device.

12. The wireless communication node of claim 9, wherein the PRACH configuration includes a number of PRACH transmission occasions allocated for the first wireless communication device in frequency domain, wherein the number of PRACH transmission occasions allocated includes one of: one PRACH transmission occasion, two PRACH transmission occasions or four PRACH transmission occasions.

13. The wireless communication node of claim 9, wherein the PRACH configuration includes a number of PRACH transmission occasions in time domain.

14. The wireless communication node of claim 9, wherein a PRACH preamble is transmitted in one or more PRACH transmission occasions.

15. The wireless communication node of claim 9, wherein the PRACH configuration includes a relative PRACH configuration index, the relative PRACH configuration index indicating a PRACH time domain parameter corresponding to a PRACH preamble format, the PRACH preamble format configured for the second wireless communication device.

16. The wireless communication node of claim 9, wherein the PRACH configuration includes an association pattern, wherein the association pattern maps one or more synchronization signal blocks (SSBs) to a PRACH transmission occasion during an association pattern period for the first wireless communication device.

17. A wireless communication method comprising:
receiving, by a first wireless communication device from a wireless communication node, configuration information, wherein the first wireless communication device is a reduced capability user equipment, UE, device, wherein the configuration information includes a Physical Random Access Channel, PRACH, configuration including a starting position of a PRACH transmission occasion allocated for the first wireless communication device in frequency domain, and wherein the starting position of the PRACH transmission occasion allocated for the first wireless communication device is indicated by a number of offset resource blocks away from a starting of an uplink initial bandwidth part allocated for at least one of the first wireless communication device or a second wireless communication device, wherein the starting of the uplink initial bandwidth part allocated for the first wireless communication device is adjacent to an ending position of the uplink initial bandwidth part allocated for the second wireless communication device.

18. The wireless communication method of claim 17, wherein the PRACH configuration includes a number of PRACH transmission occasions allocated for the first wireless communication device in frequency domain, wherein the number of PRACH transmission occasions allocated includes one of: one PRACH transmission occasion, two PRACH transmission occasions or four PRACH transmission occasions.

* * * * *